US006477183B1

(12) United States Patent
Yamamoto

(10) Patent No.: US 6,477,183 B1
(45) Date of Patent: Nov. 5, 2002

(54) ECONOMICAL SYNCHRONIZATION SYSTEM FOR ASYNCHRONOUS TRANSFER MODE MOBILE COMMUNICATION NETWORK WITHOUT DEPENDENCE ON EXTERNAL SYSTEM

(75) Inventor: Masatoshi Yamamoto, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/189,635

(22) Filed: Nov. 10, 1998

(30) Foreign Application Priority Data

Nov. 11, 1997  (JP) .............................. 9-308870

(51) Int. Cl.⁷ ................................ H04J 3/06
(52) U.S. Cl. ................. 370/508; 370/503; 370/338; 370/350; 370/340; 370/395.1; 455/502
(58) Field of Search ................. 370/324, 328, 370/331, 335, 336, 338, 350, 395, 503, 508, 252, 519, 329, 395.1, 340; 455/13.2, 502, 503, 524

(56) References Cited

U.S. PATENT DOCUMENTS

| 4,696,052 A | * | 9/1987 | Breeden ...................... 455/503 |
| 4,800,560 A | * | 1/1989 | Aoki et al. .................. 370/324 |
| 4,850,032 A | * | 7/1989 | Freeburg ..................... 455/503 |
| 5,293,380 A | * | 3/1994 | Kondo ......................... 370/337 |
| 5,479,409 A | * | 12/1995 | Dupuy et al. ............... 370/337 |
| 5,519,710 A | * | 5/1996 | Otsuka ........................ 370/337 |
| 5,722,080 A | * | 2/1998 | Kondo ......................... 455/502 |
| 5,809,426 A |   | 9/1998 | Radojevic et al. .......... 455/502 |
| 5,828,659 A | * | 10/1998 | Teder et al. ................. 370/328 |
| 5,924,034 A | * | 7/1999 | Dupuy ......................... 455/440 |
| 6,009,086 A | * | 12/1999 | Freeburg et al. ............ 370/331 |
| 6,052,371 A | * | 4/2000 | Lemieux ...................... 370/395 |
| 6,151,311 A | * | 11/2000 | Wheatley, III et al. ...... 370/335 |
| 6,185,429 B1 | * | 2/2001 | Gehrke et al. ............... 455/502 |
| 6,252,890 B1 | * | 6/2001 | Alger-Meunier et al. ... 370/503 |

FOREIGN PATENT DOCUMENTS

| EP | 0578506 | 1/1994 |
| JP | 2-164140 | 6/1990 |
| JP | 6-30466 | 2/1994 |

OTHER PUBLICATIONS

Korean Office Action issued Feb. 28, 2001 in a related application with copy of Japanese translation and English translation of the relevant portions of the same.
Japanese Office Action issued Apr. 18, 2000 in a related application and English translation of relevant portions.

* cited by examiner

*Primary Examiner*—Ricky Ngo
*Assistant Examiner*—Phuc Tran
(74) *Attorney, Agent, or Firm*—Dickstein, Shapiro, Morin & Oshinsky, LLP.

(57) ABSTRACT

An asynchronous transfer mode network includes a high-level station and a mobile station in a boundary zone between service cells of wireless base stations connected to the high-level station through asynchronous transfer mode channels, wherein the high level station transmits a control message through the asynchronous transfer mode channels and the wireless base stations to the mobile station and receives response messages from the mobile station through the wireless base stations and the asynchronous transfer mode channels, and determines a difference between transmission time lags along the asynchronous transfer mode channels so as to make built-in clocks provided for the wireless base stations synchronous with one another.

19 Claims, 3 Drawing Sheets

ECONOMICAL SYNCHRONIZATION SYSTEM FOR ASYNCHRONOUS TRANSFER MODE MOBILE COMMUNICATION NETWORK WITHOUT DEPENDENCE ON EXTERNAL SYSTEM

FIELD OF THE INVENTION

This invention relates to a mobile communication network and, more particularly, to a synchronization system for base stations incorporated in an asynchronous transfer mode mobile communication network.

DESCRIPTION OF THE RELATED ART

The digital communication channel is broken down into a synchronous transfer mode and an asynchronous transfer mode. The synchronous transfer mode and the asynchronous transfer mode are abbreviated as "STM" and "ATM", respectively. In the synchronous transfer mode, time slots are periodically assigned to digital signals on different channels through the time division multiplexing, and the digital signals are transferred from a base station to a high-level station. Even if there is not any digital signal on a channel, the time slot is still periodically assigned to the channel, and the utilization factor is rather low. Therefore, the synchronous transfer mode is less appropriate for variable traffic data such as voice data and packet data. On the other hand, digital signals on different channels are formed into fixed-length cells, and the fixed-length cells are multiplexed depending upon the traffic on each channel. For this reason, the asynchronous transfer mode is more appropriate for the variable traffic data.

A mobile communication network is expected to transmit variable traffic data, and the asynchronous transfer mode is desirable for the mobile communication network. A high-level station is shared between plural base stations in the mobile communication network, and a synchronization between the base stations is required for a hand-off.

Signal transmission timings at the base stations are controlled in a time division multiple access, which is abbreviated as "TDMA", system. The time division multiple access establishes a synchronization between the base stations with respect to the high-level station in the mobile communication network, and is effective against the silent time due to the hand-off.

A code division multiple access, which is abbreviated as "CDMA", system is attractive to the communication service, because the user channels per unit band width are more than the user channels of the time division multiple access. The code division multiple access requires the synchronization for continuous communication at the hand-off.

Nevertheless, it is not easy to establish the synchronization between the base stations with respect to the high-level station in the asynchronous transfer mode network, because the transmission delay is always varied.

Japanese Patent Publication of Unexamined Application No. 6-30466 proposes an asynchronous transfer mode mobile communication system between plural base stations and a control station. The asynchronous transfer mode mobile communication system includes a mobile communication controlling station and wireless base stations communicable with the mobile communication controlling station through plural transmission channels. The transmission channels are respectively connected to signal processing units incorporated in the mobile communication controlling station. A channel controller is provided between modulator/demodulator units and the transmission channels. When a hand-off is required, the wireless base station needs to change a modulator/demodulator unit communicating with a mobile station to another modulator/demodulator unit, and the channel controller connects the new modulator/demodulator to the transmission channel already used. Thus, the channel controller changes the connection between the modulator/demodulator units and the transmission channels at the hand-off, and any interruption does not take place in the communication with the mobile station. However, the Japanese Patent Publication of Unexamined Application is silent to the synchronization between the base stations.

If a high-precision clock signal is shared between wireless base stations, the high-precision clock signal makes the base stations synchronous with one another with respect to the high-level station. FIG. 1 illustrates the prior art asynchronous transfer mode mobile communication system proposed as TIA/EIA/IS-95-A system. Wireless base stations 1/2 are connected through asynchronous transfer mode channels 3/4 to a high-level station 5, and a mobile station 6 is communicating with the wireless base station 1 through a radio channel 7. The global positioning system is available for the synchronization between the wireless base stations 1 and 2. The global positioning system is abbreviated as "GPS", and the twenty-four space satellites broadcast high-precision clock signal indicative of the current time. GPS receivers 1a/2a are incorporated in the wireless base stations 1/2, respectively, and the high-precision clock signal establishes the synchronization between the wireless base stations 1/2.

A cesium atomic clock can provide a highly reliable clock signal, and is available for the synchronization between the base stations in the asynchronous transfer mode mobile communication system.

However, the cesium atomic clock is so expensive that the installation in each base station is not feasible. On the other hand, the GPS receiver 1a/2a is economical, and the prior art synchronization system shown in FIG. 1 is feasible in view of the cost. However, the space satellites can not eternally broadcast the high-precision clock signal. For this reason, the prior art synchronization system is less reliable.

SUMMARY OF THE INVENTION

It is therefore an important object of the present invention to provide a synchronization system for an asynchronous transfer mode mobile communication network which is economical and reliable.

To accomplish the object, the present invention proposes to periodically measure a difference in transmission time lags along asynchronous transfer mode channels.

In accordance with one aspect of the present invention, there is provided a n asynchronous transfer mode network comprising a plurality of low-level stations communicable with at least one mobile station in a boundary zone between service cells of the plurality of low-level stations, a high-level station communicable with the plurality of low-level stations through respective asynchronous transfer mode channels, and a synchronization system including a plurality of clocks respectively associated with the high-level station and the low-level stations and independently indicating current times, a message transmitting unit associated with the high-level station and concurrently transmitting a control message from the high-level station to the plurality of low-level stations through the asynchronous transfer mode channels, a plurality of message relaying units respectively associated with the plurality of low-level stations, replaying the control message from one of the plurality of low-level stations to the at least one mobile station, respectively receiving a plurality of first response messages respectively supplied from the at least one mobile station to the plurality of low-level stations and respectively transmitting a plurality of second response messages from the plurality of low-level stations through the asynchronous transfer mode channels to the high-level station, at least one first message generator associated with the at least one mobile station and transmitting the plurality of first response messages to the plurality of message relaying units after the at least one mobile station receives the control message, a plurality of second message generators respectively connected to the plurality of message relaying units and respectively producing the plurality of second response messages each representative of the current time indicated by the clock associated with one of the plurality of low-level stations and a first message transmission routine from aforesaid one of the plurality of low-level stations to the at least one mobile station and vice versa and a timing regulator connected to the message transmitting unit and determining a difference between transmitting time lags along the asynchronous transfer mode channels on the basis of the second response messages and a plurality of second message transmission routines from the high-level station to the at least one mobile station and vice versa for supplying a piece of control information representative of the difference between the transmitting time lags to the plurality of low-level stations.

BRIEF DESCRIPTION OF THE DRAWINGS

The features and advantages of the synchronization system will be more clearly understood from the following description taken in conjunction with the accompanying drawings in which.

DESCRIPTION OF THE PREFERRED EMBODIMENT

Figure 1:
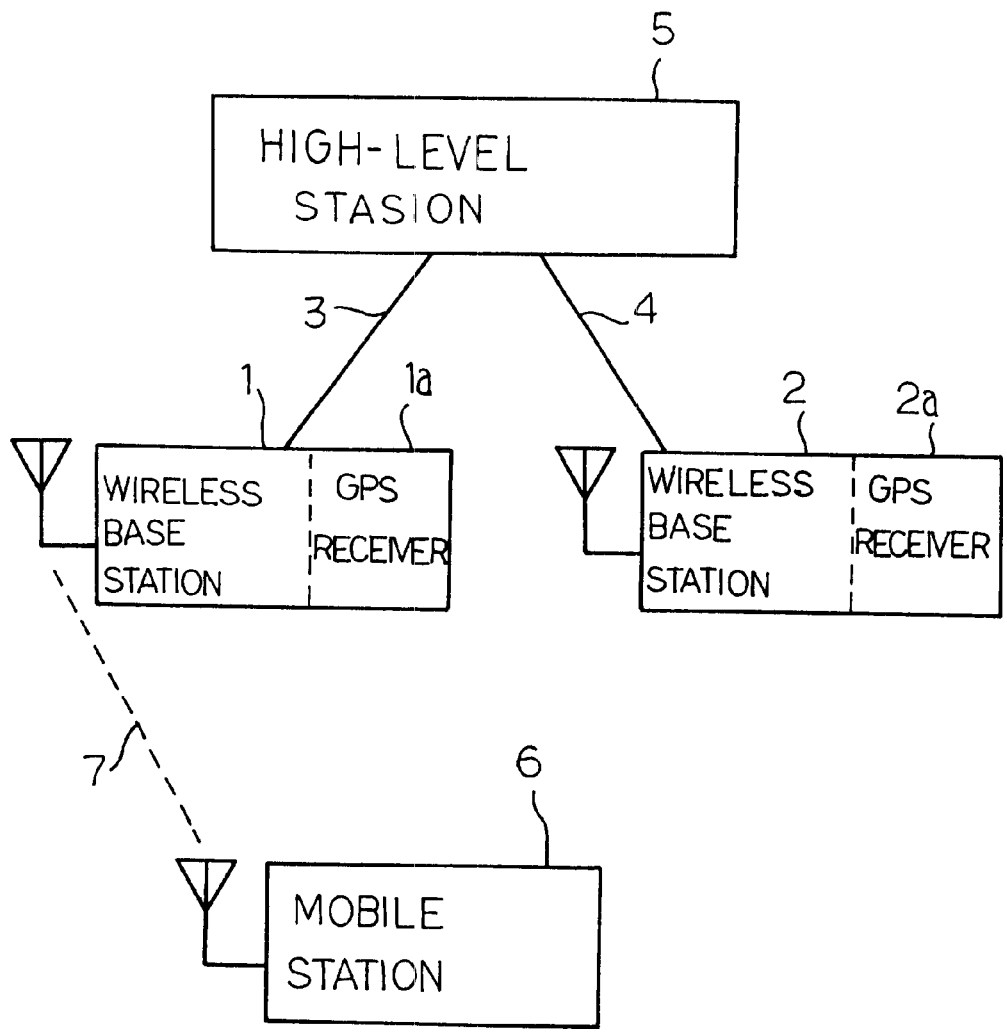
FIG. 1 is a schematic view showing the prior art synchronization system for an asynchronous transfer mode mobile communication system.
Figure 2:
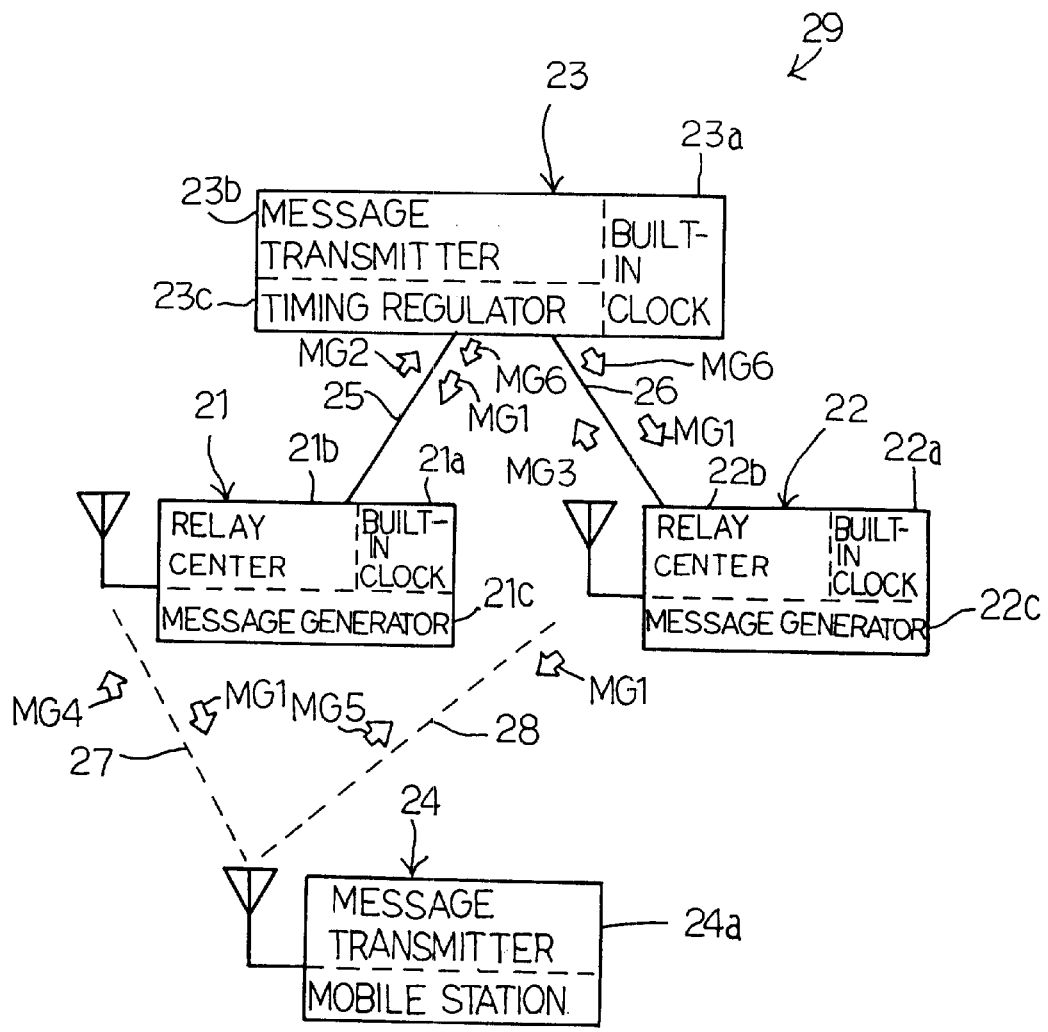
FIG. 2 is a schematic view showing a synchronization system for an asynchronous transfer mode mobile communication network according to the present invention.

Referring to FIG. 2 of the drawings, an asynchronous transfer mode mobile communication network comprises plural wireless base stations 21/22, a high-level station 23 such as a mobile communication control station and plural mobile stations 24. Although the mobile stations 24 are communicating with the wireless base stations 21/22, only one mobile station 24 is shown in FIG. 2. The wireless base stations 21/22 are connected through asynchronous transfer mode channels 25/26 to the high-level station 23, and the mobile station 24 transmits a transmitting signal 27 to a radio channel 27/28. The high-level station 23 and the wireless base stations 21/22 are stationary, and service areas or service cells are assigned to the wireless base stations 21/22, respectively. The mobile stations 24 are movable in the service cells, and some mobile stations 24 are moved from certain service cells to different service cells adjacent to the certain service cells.

In this instance, a 155 Mbps asynchronous transfer mode network provides the asynchronous transfer mode channels 25/26, and a TDMA mobile telephone network provides the radio channels 27/28. For this reason, the mobile station 24 communicates through the radio channels 27/28, the wireless base stations 21/22, the asynchronous transfer mode channels 25/26 and the high-level station 23 to another mobile station or a telephone. For this reasons the wireless base stations 21/22 for the communications between the mobile stations 24 or the mobile station 24 and the telephone serve as low-level stations, respectively.

Built-in clocks 21a/22a/23a are incorporated in the wireless base stations 21/22 and the high-level station 23, respectively, and the built-in clocks 21a/22a/23a independently indicate time. The price of the built-in clock 21a/22a/23a is much smaller than that of the cesium atomic clock. For this reason, the built-in clocks 21a/22a/23a are employable in the asynchronous transfer mode mobile communication network according to the present invention.

The high-level station further includes a message transmitter 23b and a timing regulator 23c. The message transmitter 23b generates a control message MG1 representative of an initiation of timing regulation, and concurrently transmits the control message MG1 to the timing regulator 23c and the wireless base stations 21/22. In this instance, a layer-3 message in the TDMA mobile telephone system is expanded so as to define the control message MG1. The control message MG1 is transmitted through the asynchronous transfer mode channels 25/26 to the wireless base stations 21/22.

The timing regulator 23c is responsive to the control message MG1, and starts to establish a synchronization in the asynchronous transfer mode network. The timing regulator 23c measures the lapses of time from the receipt of the control message MG1 to receipt of each response message MG2/MG3 from the wireless base station 21/22. The response message MG2 represents a lapse of time from the receipt of the control message MG1 to receipt of a response message MG4 from the mobile station and the current time indicated by the built-in clock 21a. Similarly, the response message MG3 represents a lapse of time from the receipt of the control message MG1 to receipt of a response message MG5 from the mobile station and the current time indicated by the built-in clock 22a. The timing regulator 23c calculates the difference between the transmission time lags from the high-level station 23 to the wireless base stations 21/22 along the asynchronous transfer mode channels 25 and 26 and the difference between the transmission time lags from the wireless base stations 21/22 to the high-level station 23 on the basis of the lapses of time. When the differences of transmission time lags are determined, the timing regulator 23c checks the response messages MG2/MG3 to see whether or not the transmission time lags are correctly reflected on the built-in clocks 21a/22a. If not, the timing regulator 23c supplies a control message MG6 to the built-in clocks 21a/22a. The control message MG6 is representative of putting back the built-in clock 21a/22a a certain time or putting the built-in clock 21a/22a forward a certain time. Thus, the timing regulator 23c makes the wireless base stations 21/22 synchronous with one another.

The wireless base stations 21/22 are similar in internal arrangement to one another. The wireless base station 21/22 further includes a relay center 21b/22b and a message generator 21c/22c. Although all the relay centers 21b/22b can relay the control message MG1 to the mobile station 24, one of the relay centers 21b/22b relays the control message MG1 to the mobile station 24, and the other relay center does not relay the message MG1 to the mobile station 24. All the relay centers 21b/22b respectively relay the control message MG1 to the associated message generators 21c/22c, and report arrivals of the response messages MG4/MG5 to the associated message generators 21c/22c. The message generators 21c/22c start to measure lapses of time from the receipt of the control message MG1 to receipts of the response messages MG4/MG5, respectively. The message generators 21c/22c determine the lapses of time and the arrival times of the response messages MG4/MG5. The message generators 21c/22c respectively generates the response messages MG2/MG3 representative of the lapses of time and the current times or the arrival times, and transmit the response messages MG2/MG3 to the timing regulator 23c.

The mobile station 24 is assumed to be at the boundary between the service cell of the wireless base station 21 and the service cell of the wireless base station 22. The mobile station includes a message transmitter 24a. The message transmitter 24a is responsive to the control message MG1 from either wireless base station 21/22, and introduces a predetermined delay time between the receipt of the control message MG1 and the transmission of the response messages MG4/MG5. The response message MG4 is identical with the response message MG5. In other words, the wireless base station 22 monitors the response message MG4 transmitted to the wireless base station 21, and recognizes the monitored message MG4 as the response message MG5. The transmission times through the radio channels 27/28 are exactly measured on the basis of the phase difference, and the arrival times are corrected as if the mobile station 24 is equally spaced from the wireless base stations 21 and 22. In other words, time lag (t6–t5) is equal to zero (see FIG. 3).

The built-in clocks 21a/22a/23a, the message transmitter 23b, the timing regulator 23c, the relay centers 21b/22b, the message generators 21c/22c and the message transmitter 24a as a whole constitute a synchronization system 29 according to the present invention.

Figure 3:
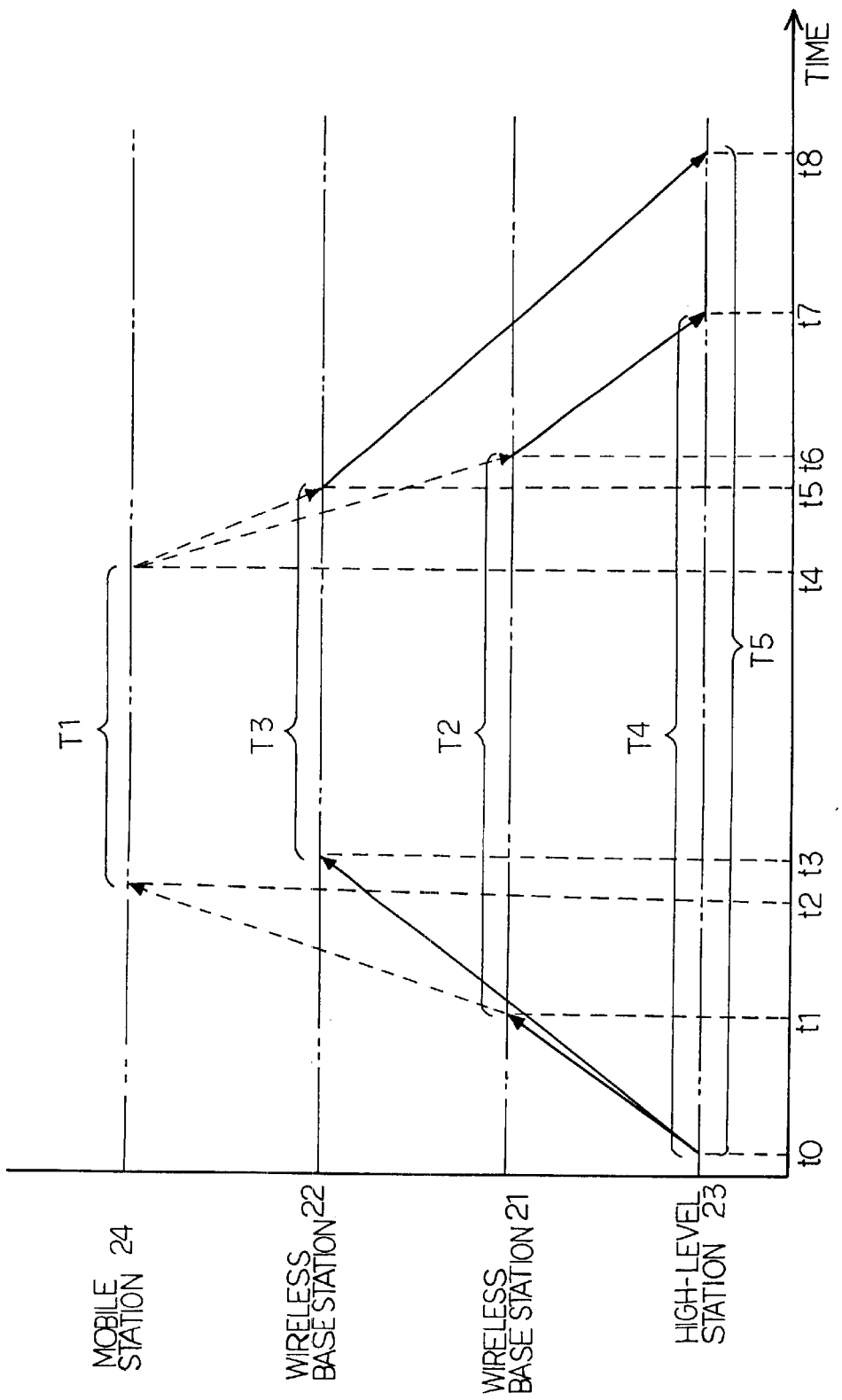
FIG. 3 is a timing chart showing a determination of transmission time lags carried out by the synchronization system.

The synchronization system 29 determines the transmission time lag as follows. FIG. 3 illustrates message transmission timings and message receiving timings. The high-level station 23 transmits the control message MG1 at time t0, and the wire less stations 21 and 22 receive the control message MG1 at t1 and t3, respectively. The wireless base station 21 relays the control message MG1 to the mobile station 24, and the control message MG1 arrives at the mobile station 24 at t2.

The mobile station 24 introduces the predetermined time delay T1, and transmits the response messages MG4/MG5 to the wireless base stations 21/22 at time t4. The response messages MG4/MG5 arrive at the wireless base stations 21/22 at t5 and t6, respectively. However, the transmission time lag due to the difference in distance between the mobile station 24 and the wireless base stations 21/22 is corrected as if the difference between t5 and t6 is zero. The wireless base stations 21/22 determines the lapses of time T2/T3 and the times when the response messages MG4/MG5 actually arrive at the wireless base stations 21/22. The difference between the lapses of time T2 and T3 is representative of the difference in transmission time lag from the high-level station 23 to the wireless base stations 21/22 along the asynchronous transfer mode channels 25 and 26.

The wireless base stations 21/22 produce the response messages MG2/MG3, and transmit the response messages MG2/MG3 to the high-level station 23. The high-level station 23 determines the lapses of time T4/T5. The difference between the lapses of time T4/T5 contains not only the difference between the transmission time lags from the high-level station 23 to the wireless base stations 21/22 but also the difference between the transmission time lags from the wireless base stations 21/22 to the high-level station 23. For this reason, the difference between the transmission time lags from the wireless base stations 21/22 to the high-level station 23 is expressed as (T5–T4)–(T2–T3). The synchronization system 29 may periodically repeat the timing regulation described hereinbefore.

As will be appreciated from the foregoing description, the synchronization system 29 determines the differences in transmission time lag between the asynchronous transfer mode channels 25 and 26, and supplies the control message MG6 to the wireless base stations 21/22 so as to put the built-in clocks 21a/22a back or forward. As a result, the differences in the transmission time lag are taken into account, and the built-in clocks 21a/22a respectively indicate corrected times available for the synchronization between the wireless base stations 21/22. The synchronization system 29 is never dependent on any external system, and is surely reliable.

Although a particular embodiment of the present invention has been shown and described, it will be apparent to those skilled in the art that various changes and modifications may be made without departing from the spirit and scope of the present invention.

For example, the timing regulator 23c and the message generators 21c/22c may simply determine arrival times and/or transmission times so that the timing regulator 23c calculates the differences in transmission time lag along the arrival times and/or the transmission times.

The wireless base stations 21/22 may communicate with the mobile station through the CDMA channels or another kind of channels.

What is claimed is:

1. An asynchronous transfer mode network comprising:
   a plurality of low-level stations communicable with at least one mobile station in a boundary zone between service cells of said plurality of low-level stations;
   a high-level station communicable with said plurality of low-level stations through respective asynchronous transfer mode channels; and
   a synchronization system including
      a plurality of clocks each respectively associated with a corresponding one of said high-level station and said low-level stations, and each clock independently indicating a current time,
      a message transmitting unit associated with said high-level station and concurrently transmitting a control message from said high-level station to said plurality of low-level stations through said asynchronous transfer mode channels,
      a plurality of message relaying units each respectively associated with a corresponding one of said plurality of low-level stations, for replaying said control message from one of said plurality of low-level stations of said at least one mobile station, each message relaying unit respectively receiving a first response message respectively supplied from said at least one mobile station to said plurality of low-level stations and respectively transmitting a second response message from said plurality of low-level stations through said asynchronous transfer mode channels to said high-level station,
      for each mobile station of said at least one mobile station, a first message generator associated with the corresponding mobile station and respectively transmitting said first response messages to said plurality of message relaying units after said at least one mobile station receives said control message, a plurality of second message generators each respectively connected to a corresponding one of said plurality of message relaying units and respectively producing said second response message, each second response message representative of the current time indicated by the clock associated with the corresponding one of said plurality of low-level stations and a first message exchange period between said corresponding one of said plurality of low-level stations and said at least one mobile station, and a timing regulator connected to said message transmitting unit and determining a difference between transmitting time lags along said asynchronous transfer mode channels on the basis of said second response messages and a plurality of second message exchange periods between said high-level station and said at least one mobile station through said low-level stations for supplying a piece of control information representative of said difference between said transmitting time lags to said plurality of low-level stations.

2. The asynchronous transfer mode network as set forth in claim 1, in which each of said first message exchange periods is represented by a first lapse of time between the arrival time of said control message at said corresponding one of said plurality of low-level stations and the arrival time of the respective first response message and each of said plurality of second message exchange periods is represented by a second lapse of time between the time of transmission of said control message and the time of arrival of a respective one of said plurality of second response messages at said high-level station through one of said asynchronous transfer mode channels.

3. The asynchronous transfer mode network as set forth in claim 2, in which a difference in arrival times of said plurality of first response messages respectively at said plurality of low-level stations is corrected in a manner as if said at least one mobile station is equally spaced from said plurality of low-level stations.

4. The asynchronous transfer mode network as set forth in claim 1, in which said difference between said transmission time lags include a first time difference arising from a signal transmission from said high-level station to said plurality of low-level stations respectively along said asynchronous transfer mode channels and a second difference arising from respective signal transmissions from said plurality of low-level stations to said high-level station.

5. The asynchronous transfer mode network as set forth in claim 4, in which said first time difference is determined on the basis of a difference between said first message exchange periods corresponding to said plurality of low-level stations, and said second time difference is determined on the basis of a difference between said plurality of second message exchange periods and said first time difference.

6. The asynchronous transfer mode network as set forth in claim 5, in which each of said first message exchange periods is represented by a first lapse of time between arrival of said control message at said corresponding one of said plurality of low-level stations and arrival of said respective first response message, and each of said plurality of second message exchange periods is represented by a second lapse of time between the transmission of said control message and arrival of a respective one of said plurality of second response messages at said high-level station through said asynchronous transfer mode channels.

7. The asynchronous transfer mode network as set forth in claim 6, in which said first time difference is determined through a first subtraction between the respective first lapses of time.

8. The asynchronous transfer mode network as set forth in claim 7, in which said second time difference is determined through a second subtraction between the respective second lapses of time and a third subtraction between the difference of said first subtraction and the difference of said second subtraction.

9. The asynchronous transfer mode network as set forth in claim 1, in which said plurality of low-level stations communicate with said at least one mobile station by using a time division multiple access technology.

10. A synchronizing system comprising:
a high-level station including
a message transmission unit,
a measuring unit for measuring a response time period, and
a built-in clock;
a plurality of wireless base stations each including
a respective message relaying unit,
a respective measuring unit for measuring a respective response time period, and
a respective built-in clock;
a mobile station including a message response unit; and
an asynchronous transfer mode network for communication between at least said high-level station and said plurality of wireless base stations,
wherein when said mobile station is communicable with said plurality of wireless base stations, transmission time periods are measured between said high-level station and said plurality of wireless base stations, and a difference between the measured transmission time periods is accounted for, if necessary.

11. A method of synchronizing base stations in an ATM mobile communication network when a mobile station is in a boundary condition between adjacent base stations, comprising:
sending a first control signal from a high-level station to a plurality of base stations;
relaying the first control signal to the mobile station from one of the plurality of base stations;
after receiving the control signal, transmitting a first response message from the mobile station to the plurality of base stations;
at each base station, sending a second response message to the high-level station after receiving the response message;
at the high-level station, calculating a time lag of each base station based on the second response messages received from each of the base stations and the corresponding arrival times thereof; and
transmitting, from the high-level station, a second control message to the plurality of base stations to synchronize the base stations.

12. The method of synchronizing base stations according to claim 11, wherein the first control signal is relayed to the mobile station from a base station among the plurality of base stations which first receives the first control signal from the high-level station.

13. The method of synchronizing base stations according to claim 11, wherein each second response message sent to the high-level station from a corresponding base station contains information of the arrival time of the first response message from the mobile station at the respective base station, and the lapse of time between the time of arrival of the first control message from the high-level station at the respective base station and the time of arrival of the first response message from the mobile station.

14. The method of synchronizing base stations according to claim 11, wherein the time lag of each base station is calculated by determining a first difference between the arrival times of the second response messages in the high-level station, and a second difference between the lapses of time contained in the received second response messages, and then subtracting the second difference from the first difference.

15. The synchronizing system according to claim 10, wherein the difference in transmission time periods is resolved in the plurality of base stations.

16. The synchronizing system according to claim 15, wherein the difference in transmission time periods is resolved by resetting at least one of the respective built-in clocks in the plurality of base stations.

17. The synchronizing system according to claim 10, wherein the base stations become synchronized with each other upon accounting for the transmission time period difference.

18. The synchronizing system according to claim 10, wherein the measured transmission time period between said high-level station and each of said plurality of wireless base stations encompasses a transmission time period between said mobile station and the respective wireless base station.

19. The synchronizing system according to claim 10, wherein the measured transmission time period between said high-level station and each of said plurality of wireless base stations includes a transmission time period between said mobile station and the respective wireless base station as well as a round trip transmission time between said respective wireless base station and said high-level station.

* * * * *